403-256 AU 353 EX
FIP8005 OR AI 107
[redacted]
E. L. FREEMAN.
Cultivator.
No. 107. A. I. Patented Jan'y 3, 1854.
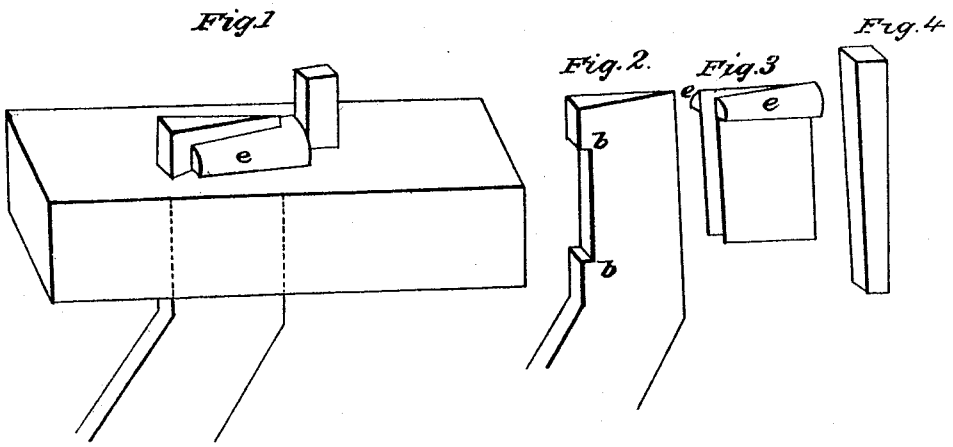
N. PETERS, Photo-Lithographer, Washington, D. C.